United States Patent [19]

Rostad

[11] 3,736,958
[45] June 5, 1973

[54] FOUR-WAY SOLENOID SELECTOR VALVE

[75] Inventor: Nels C. Rostad, Glendale, Calif.
[73] Assignee: Lockheed Aircraft Corporation, Burbank, Calif.
[22] Filed: Apr. 13, 1972
[21] Appl. No.: 243,697

[52] U.S. Cl. ...... 137/625.6, 137/625.64, 137/625.66
[51] Int. Cl. ............................................. F16k 11/00
[58] Field of Search .................. 137/625.6, 625.65, 137/625.64, 625.69, 625.3, 625.66, 625.48; 91/31, 461

[56] References Cited

UNITED STATES PATENTS 3,238,966  3/1966  Howard et al. ............... 137/625.66 X

*Primary Examiner*—Henry T. Klinksiek
*Assistant Examiner*—Robert J. Miller
*Attorney*—Frank L. Zugelter and George C. Sullivan

[57] ABSTRACT

A four-way solenoid selector valve comprising a valve spool slidable in a housing bore; input, outlet and return ports communicating therewith; a chamber piston mounted on the one end of the spool, subject to fluid pressure changes on its faces to cause its axial translation in either direction; and restrictive orifices disposed in passageways communicating with the piston chamber. Solenoid actuated poppet valves close and open such passageways to the return port while ducts which communicate with the input port are connected to the poppet valves. Energization of a solenoid of one or the other of such valves provides uncovering of corresponding metering slots for the two outlet ports as a result of translation of the valve spool. The corresponding restrictive orifice controls or programs the rate of flow from the piston chamber so as to effect a relatively slow time span desired in opening or uncovering such metering slots. A spring system mounted at the other end of the spool, in a cavity, is provided to return the selector valve to its neutral state upon de-energization of the solenoid.

17 Claims, 1 Drawing Figure

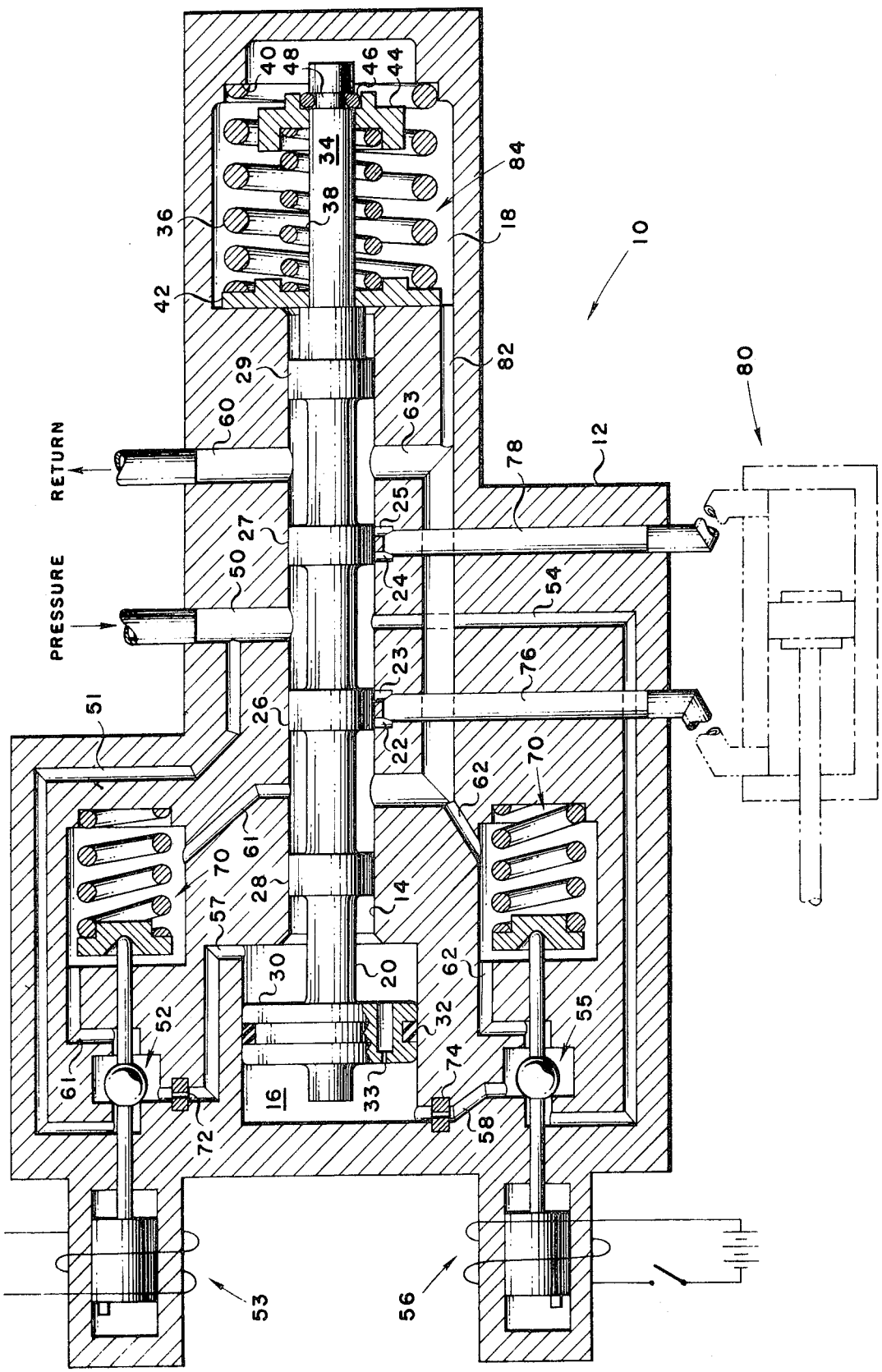

FOUR-WAY SOLENOID SELECTOR VALVE

BACKGROUND OF THE INVENTION

1. Field of the Invention

The field of art to which the invention is most likely to pertain may be generally located in the class of devices relating to valves. Class 251, Valves and Valve Actuation, and Class 137, Fluid Handling, United States Patent Office Classifications, appear to be the applicable general areas of art in which subject matter similar to this invention have been classified in the past.

2. Description of the Prior Art

The following U. S. Letters Patent disclose art which appears to be pertinent to the subject invention: U.S. Pat. Nos. 2,725,077; 2,836,196; 2,853,976; 3,046,951; and 3,213,886.

PROBLEMS IN THE PRIOR ART

In the past, motor operated valves have been utilized to accomplish the same end result as the subject invention; namely, a precisely controlled, smoothly operating, and relatively slow opening for fluid egress to hydraulic actuators. However, these valves are heavy and expensive compared to solenoid-operated valves. On the other hand, these latter valves include the inherent characteristic of being fast-action as they open and close as fast as the action of their solenoids. On aircraft, including compound vehicles which provide alternate helicopter and fixed-wing modes of operation, the weight and cost of motor-operated valves for folding and unfolding rotor blades would be prohibitive. The conventional four-way solenoid actuated valves would react too fast in relation to their hydraulic actuators, resulting in producing high initial shocking characteristics normally associated with hydraulic cylinder actuators. Whereas, relatively slower but smoother acting valve would not only eliminate these high initial shocking characteristics, such a valve would provide a precision control for the movement of large masses, such as landing gear, in all types of aircraft.

SUMMARY OF THE INVENTION

An object of this invention is to provide a slow moving selector valve in its opening and closing performances. Such a valve may be defined as a device for directing the flow of fluid, such as hydraulic, in a system into the desired actuating circuit.

Another object of this invention is to provide precise control of movement for large masses, such as landing gear apparata, by controlling the time over which a four-way solenoid actuated valve functions.

Another object of this invention is to provide an automatic self-purging or bleeding characteristic in a selector valve, one which does not require a special bleeding procedure to restore proper operation of the selector valve, by mere cycling of the valve. The corollary to this is the object of achieving a valve device which tolerates small quantities of air in the oil with only slight but immaterial changes in the function thereof.

Another object of this invention is to provide a wide range of motions for a four-way slide selector valve in terms of time it takes to open or close the valve.

Another object of the invention is to provide a maximum acceleration or deceleration for a given mass in moving it, by a smooth performance of the invention without shock or jerking effects being realized in such mass. Thus, undesired loads or unstable conditions for such mass is obviated.

A further object of this invention is to eliminate any problem of tolerance by providing a perfect centering for a valve spool in its neutral position.

A still further object of the invention is to provide multiple absolute stops for such a mass, without shocking or jerking effects.

These and other objects and advantages will become more fully apparent from a complete reading of the following descriptions, appended claims thereto and the single FIGURE constituting a drawing of the preferred embodiment of the invention.

The single FIGURE illustrates in full and in section the features of the preferred embodiment of the invention.

DESCRIPTION OF THE PREFERRED EMBODIMENT

Referring now to the FIGURE in which reference characters correspond to like numerals hereinafter, the selector valve device 10 comprises a housing or body 12, preferably metal, having a longitudinal bore 14 which communicates at its one end with a fluid chamber 16, and with a cavity 18 at its other end, all being formed in the body 12 in any suitable fashion. A valve spool 20 is longitudinally and slidably mounted in the bore 14, and has a substantially fluid tight fit therein. A plurality of metering slots 22, 23, 24 and 25 are formed and arranged along the length of the bore 14 relative to a plurality of correspondingly spaced lobes 26 and 27, as shown in the FIGURE. The metering slots 22, 23, 24 and 25 are adapted to establish fluid communication between inlet, outlet and return ports communicating with the bore 14 upon actuation of the device 10 by which the spool 20 is shifted longitudinally of the bore 14, and as will become fully apparent hereinafter.

A pair of lobes 28 and 29 are formed adjacent the ends of the valve spool 20 for the purpose of balancing return chamber pressures in bore 14 existing between lobes 28 and 26, and between the lobes 27 and 29. A piston 30 is securely mounted on the one end of the spool 20 extending into the fluid chamber 16. The piston 30 advances in one of its two axial directions under a developed force from a fluid pressure transmitted to a corresponding one of its two faces. A suitable seal 32 is provided in a conventional manner about the piston 30 to prevent leakage of fluid to each side of the piston 30. On the other hand, an orifice 33 is provided in the piston 30 to purposefully provide a predetermined amount of leakage to pass in the chamber 16 from one side to the other side of the piston 30 in accordance with the operation of the device 10, to be more fully described hereinafter. A stem 34 is attached to the other end of the spool 20, and is preferably made integral therewith. The stem 34 extends into the cavity 18, and has mounted thereon, a pair of coiled springs 36, 38, one having a greater diameter than the other. Both springs 36, 38 are concentrically mounted about the stem 34. The larger spring 36 is retained, under compression, between a shoulder 40 partially forming cavity 18 adjacent its outer terminus and a washer member 42 seated at the inner terminus of the cavity 18. It is to be noted that the washer member 42 also seats on the end of the spool 20 in the condition or position of the valve selector 10 shown in the FIGURE and during one particular actuation of the device 10, to be described presently. The smaller spring 38, also under compression, is seated against the washer member 42 at its one end while its other end engages a retainer ring 44 mounted about and at the free end of the stem 34. The retainer ring 44 is seated against a locking ring 46 firmly enveloping a groove 48 provided in the stem 34.

A system pressure or inlet port 50 is provided in the valve body 12 to communicate with the metering slots 23 and 24, and to communicate via a duct 51 with a conventional directional poppet valve mechanism 52 operable in a known fashion upon energization of and by a solenoid 53. The port 50 also communicates with a duct 54 which communicates with a conventional directional poppet valve mechanism 55 also operable in a known fashion upon energization of and by a solenoid 56. Both poppet valve mechanisms 52, 55 are disposed in suitable voids in the body 12 and are normally closed, as shown in the FIGURE, without energization of their respective solenoids 53, 56. Thus, flow of fluid in ducts 51, 54 is prevented from passing through them into a pair of passageways 57, 58, respectively communicating with such voids and with the chamber 16 on opposite sides of the piston 30 therein.

A system return port 60 is provided in the valve body 12 to communicate with the metering slots 22 and 25 for returning the flow of fluid passing through the selector valve 10 to the system from which it comes. A pair of return conduits 61, 62, which communicate with the respective voids containing the poppet valve mechanisms 52, 55, are connected to a common passage 63 provided in the body 12 and which communicates with the return port 60. It is to be noted that each of the return conduits 61, 62 communicate with a side of its associated poppet valve mechanism 52, 55 which opposes the side thereof which communicates with its associated passageway 51, 54. A conventional spring return mechanism 70 is provided for each poppet valve mechanism 52, 55 to return its corresponding mechanism 52, 55 to its normally closed position upon de-energization of its corresponding solenoid 53, 56; and in this preferred embodiment, ingress of the conduits 61, 62 to their respective mechanisms 70 is preferred.

A restricting orifice 72, 74 is provided for communication or connection of the fluid chamber 16 to each of the respective sides of the piston 30 with the return port 60. In the illustrated embodiment, the restricting orifice 72 is located in the passageway 57 between the chamber 16 and the poppet valve mechanism 52. The restricting orifice 74 is located in the passageway 58 between the chamber 16 and the poppet valve mechanism 55. Although not shown, a filtering means, such as a screen, to each side of such orifices, and to each side of the orifice 33 in the piston 30 as well, is preferably included to prevent clogging-up of such orifices as a result of possibly a flow of contaminated fluid through the valve selector 10. The importance of these orifices themselves will become more fully apparent hereinafter.

A pair of output ports 76, 78 connect the bore 14 via their corresponding metering slots 22, 23, 24, 25 to a means to actuate, say, a hydraulic actuator, by the operation of the selector valve 10, other devices such as, for example, a landing gear apparatus or a wing or rotor blade, each of which is to be folded or unfolded. Such means is illustrated in phantom in the FIGURE as a hydraulic cylinder means 80 whose piston and piston shaft are translated in one of two directions with each operation of the selector valve 10. This means 80 may be employed as a feed mechanism for machines where loads must be handled smoothly and gently. It is to be understood that the illustrated hydraulic cylinder of the means 80 is set forth merely for purposes of illustration and simplicity, as the lines 76, 78 may lead to a fluid motor or other equivalent mechanism(s).

In the center position or condition for the selector valve 10 shown in the FIGURE, the bore 14 is closed to both output ports 76, 78 connected to the means 80, by reason of the lobes 26, 27 of the valve spool 20 covering the metering slots 22, 23 and 24, 25, respectively, and the selector valve 10 may be defined as being in a neutral or null state. A force on one of the two faces of the piston 30 causes the valve spool 20 to advance or translate in the direction of the applied force, thereby uncovering either metering slots 22, 24 or 23, 25. It will be seen that as both output ports 76, 78 are connected to the bore 14 in any given instance of actuation of the valve selector 10, only one of the two is in communication with the system input port 50 in such instance, while the other of such ports is in communication with the return port 60. This relationship will become more fully apparent from a reading of the description of the operation of the selector valve 10 hereinafter.

It also will be seen that a passageway 82 connects the cavity 18 to the common passage 63 directly leading to the return port 60 via the bore 14. Such passageway 82 is provided in the preferred embodiment to release any build-up of fluid which might otherwise leak through any lap clearance that may exist between the lobe 29 and the bore 14, and which could affect the proper functioning of the springs 36, 38, which is considered as a system or means 84 for returning the selector valve 10 to its neutral or null state. In other words, an undesired pressure from fluid leakage could develop in the chamber 18 which conceivably could establish an undesired adverse force on the system 84 and which could thus affect the proper operation of the selector valve 10.

In order to more fully understand the invention, the operation of the selector valve 10 will be first described as if the restricting orifices 72, 74 and 33 were not included therein. Than a description of the operation of the device 10 including such orifices will follow, to the extent of the change in the operation thereof and which is then necessary to describe the operation including such orifices.

As the solenoid 53 is energized, the poppet valve mechanism 52 opens, thereby providing flow of fluid in intake port 50 and duct 51 to pass into passageway 72 and the chamber 16 while closing off the return conduit 61. A force is transmitted to the right face of the piston 30, causing the valve spool 20 to move to its left. The metering slots 23 and 25 are uncovered to and from their output ports 76, 78, respectively. Such communication only provides for the connection of the system port 50 to the output port 76 and for the connection of the output port 78 to the return port 60. Thus, the piston and its shaft in the means 80 moves to the right, while fluid in the output port 78 is exhausted to the return port 60. Upon de-energization of the solenoid 53, its corresponding poppet valve mechanism 52 closes, and the exerted pressure on the right face of the piston 30 is released as fluid therefrom now flows through the return conduit 61 to the common passage 63, and thence to the return port 60. As a result of this action, the piston 30 seeks its original position which, of course, is the null or neutral state for the selector valve 10, by means of the action of the spring system 84. In the system 84, the retaining ring 44 had been carried to the left, further compressing the smaller spring 38. When the solenoid 53 was de-energized, fluid to the right side of the piston 30 was exhausted, and thus, the spring 38 returns the valve spool 20 to its center position.

A similar action occurs upon energization of the solenoid 56. Its corresponding poppet valve mechanism 55 opens, thereby providing fluid in the system port 50 and the duct 54 to flow into the passageway 58 and the chamber 16 while closing off the return conduit 62. A force is transmitted to the left face of the piston 30, causing the valve spool 20 to move or translate to the right. The metering slots 22 and 24 are uncovered to and from across their output ports 76, 78, respectively. Such communication only provides for the connection of the system port 50 to the output port 78 and for the connection of the output port 76 to the return port 60 via the common passage 63. Thus, the piston and its shaft in the means 80 moves now to the left, while fluid in the output port 76 is exhausted to the return port 60. Upon de-energization of the solenoid 56, its corresponding poppet valve mechanism 55 closes, and the exerted pressure on the left face of the piston 30 is released as fluid therefrom flows trough the return conduit 62 to the common passage 63, and thence to the return port 60. As a result of this action, the piston 30 seeks its null or neutral state for the selector valve 10 by the action of the spring system 84. In this instance, the larger spring 36 had been further compressed between the shoulder 40 of the cavity 18 and the washer member 42. When the solenoid 56 was de-energized, fluid in the chamber 16 to the left of the piston was exhausted, and thus, the spring 36 returns the valve spool 20 to its center position.

The operation of the selector valve 10 with the inclusion of the restricting orifices 72, 74 will now be described.

With the introduction of the restricting orifices 72, 74 between the chamber 16 and the return port 60, the valve spool 20 no longer slides or translates as a function of the system pressure applied to the piston 30. Rather, the valve spool 20 now moves at a specified or particular rate as a function of the dimensional sizing of such orifices 72, 74, since they restrict the otherwise unobstructed flow of fluid through a designed set of ports, conduits, ducts, passageways or openings for a selector valve 10 having a given sized piston 30 and bore 14. A slower action time is involved. Thus, each or both of the orifices are sized to program the rate of movement, or in reality, the rate at which the valve slide selector 10 opens to each of the output ports 76, 78, of the valve spool 20 against a given or desired time interval. For example, the uncovering of the metering slots 22, 24 or 23, 25 can be controlled to open in a longer time span, say, up to 1 second. A comparable standard four-way pilot operated slide selector valve normally opens in 0.05 seconds, approximately, after its solenoid is energized. Thus, the performance of the device 10 in its operation can take as much as twenty times as long as that involved for standard selector valves. A desired controlled rate for opening the valve selector 10 can be achieved in a relatively slow continuous manner. The result is the elimination of a shock load characteristic associated with a mechanism such as 80 and whatever is connected to it to operate. A mass driven by, say, hydraulic cylinder means 80 can now be accelerated in its motion without jerkiness. The movement of such mass is now completely and effectively controlled by the selector valve 10 acting through the means 80 whose rate of piston movement in turn is programmed. The means 80 starts and stops such mass smoothly in a programmed response to the device 10. This becomes very clear upon comparing the action of this invention to a conventional four-way solenoid-actuated valve in which the spool valve is attached to the solenoid so that its valve is essentially opened or closed as fast as the action of its solenoid.

This invention also has the advantage of providing more than one start and stop for the valve spool 20 and piston 30 between its extreme shifted positions, by energizing and de-energizing the solenoids as desired, without the effects of shocking and jerking.

The spring system 84 provides the return of the device 10 to its neutral state in accordance with the time and design parameters designed into a desired selector valve 10. The system 84 returns the device 10 also at a programmed rate which may be the same or different than that associated with opening thereof. The one spring 36 controls the movement of the valve spool 20 in one direction for return, while the other spring 38 controls the movement of the valve spool 20 in the opposite direction for return.

It should now be apparent that the invention has the distinct advantage of providing a wide range of motion for the device 10 in a given period of time.

The inclusion of the piston orifice 33 provides additional variations that are possible for the rate of movement for the piston 30, and thus, the rate of opening and closing of the device 10. The orifice 33 provides the additional advantage of being a safety feature, in that were one of the restrictive orifices 72, 74 clogged or plugged up, the device 10 would seek and ultimately achieve its neutral state by the leakage of fluid in the chamber 16 from one side to the other side of the piston 30.

It is apparent that the net areas on the faces of the piston 30 are not equal. Thus, in designing a particular selector valve device 10, should the rate of movement in each direction for the piston 30 be desired, a compensating sizing for the affected restrictive orifice is in order, to produce such equal rates. An alternative to this design approach is to provide an extension, not shown, from the piston 30, of equal diameter to the shaft of the valve spool 20 with which the piston 30 is adapted to shift or translate to the left face of the piston 30 and being seated in the exterior wall of the housing or body 12 forming the one end of the chamber 16. A vent to return would be included. In this manner, then, the areas on both faces of the piston 30 would be equal to each other.

It may be noted that a perfect centering or "no-slop" condition for the device 10 is included in its preferred embodiment. The washer member 42 seats on the base of the cavity 18 as the valve spool 20 moves to the left, and remains seated on a shoulder provided on the valve spool 20 as it moves to the right. In other words, no physical linear play is available at all in the translation of the valve spool 20.

The preferred embodiment illustrates a four lobe valve spool, however, the invention can be practiced in a slide selector valve having a three lobe valve spool as well.

It should also be understood that although the above description describes the various tubular connections in different terminology, such as ducts, passages, conduits, passageways, etc., for the purpose of describing the preferred embodiment, it should be obvious to the mechanic skilled in the art to observe that such connections are basically continuous fluid lines, one leading to another, and that therefore, the terminology to be found in the appended claims should not be limited to a strict construction based on the description above, but rather to be read in the spirit and light of the disclosed invention.

Pursuant to the requirements of the patent statutes, the principle of this invention has been explained and exemplified in a manner so that it can be readily practiced by those skilled in the art to which it pertains, or with which it is most nearly connected, such exemplification including what is presently considered to represent the best embodiment of the invention. However, it should be clearly understood that the above description and illustrations are not intended to unduly limit the scope of the appended claims, but that therefrom the invention may be practiced otherwise than as specifically described and exemplified herein, by those skilled in the art, and having the benefit of this disclosure.

What I claim as being patentably novel is:

1. In a four-way selector valve, the improvement comprising at least one restricting orifice in each of two passageways communicating with a chamber having alternate sides to a piston slidable therein and slidable with the valve spool for said valve, for controlling the rate of flow of fluid from such chamber to a return port for said valve upon advancement of the valve spool in a direction forcing such fluid to flow through said restricting orifice.

2. The valve of claim 1 including a restricting orifice in the piston to provide additional variation in the rate of fluid flow to the return port.

3. In a four-way selector valve having a bore, input, return and outlet ports to said bore, a slidable valve spool in said bore,
the improvement comprising
a chamber at one end of said bore,
a piston slidable in said chamber and which is also slidable with said valve spool,
a pair of passageways each communicating with the chamber to a respective side of the piston,
return conduits connecting said passageways to the return port,
a restricting orifice in each of said passageways connected to the piston chamber for controlling the rate of flow of the fluid from such chamber to a corresponding return conduit upon advancement of the valve spool in a direction forcing such fluid to flow through said restricting orifice, and
means for returning the valve spool to a position characterizing a neutral state for said selector valve.

4. The valve of claim 3 including a restricting orifice in said piston to provide additional variation in the rate of fluid flow to the return port.

5. The valve of claim 3 in which said returning means is a spring system in a cavity at the other end of said bore.

6. The valve of claim 5 in which said spring system comprises a pair of springs one mounted inside the other, both springs being retained under compression in such cavity, the one spring returning the valve spool in one direction and the other spring returning the valve spool in the other direction.

7. The valve of claim 6 including a restricting orifice in said piston to provide additional variation in the rate of fluid flow to the return port.

8. In a four-way selector valve having a bore,
input, return and outlet ports to said bore,
a slidable valve spool in said bore,
a chamber having a slidable piston therein,
said piston being adapted to slide with said valve spool,
a pair of passageways the first thereof communicating with the chamber to a side of the piston opposite the other side of the piston with which the second communicates,
each of such passageways communicating with a poppet valve mechanism,
conduits connecting said passageways through their respective poppet valve mechanisms to the return port, and
means for returning the valve spool to a position characterizing a neutral state for said selector valve,
the improvement comprising
at least one restricting orifice in each of said passageways communicating with the piston chamber for controlling the rate of flow of the fluid from such chamber to its corresponding conduit upon advancement of the valve spool in a direction forcing such fluid to flow through said restricting orifice.

9. The valve of claim 8 including a restricting orifice in said piston to provide additional variation in the rate of fluid flow to the return port.

10. In a four-way selector valve having a bore, a slidable valve spool in said bore, input, return and outlet ports connected to said bore, a return line to said return port, and means for returning the valve spool to a position characterizing a neutral state for said selector valve,
the improvement comprising
a chamber communicating with one end of the bore,
a slidable piston in said chamber and being adapted to slide with said valve spool,
a pair of passageways the first thereof communicating with the chamber to a side of the piston opposite the other side of the piston with which the second thereof communicates,
a poppet valve mechanism connecting each of said passageways to said return line, and
at least one restricting orifice in each of said passageways communicating with the piston chamber for controlling the rate of flow of the fluid from such chamber to said return line upon advancement of the valve spool in a direction forcing such fluid to flow through said restricting orifice.

11. The valve of claim 10 including a restricting orifice in the piston to provide additional variation in the rate of fluid flow to the return port.

12. A four-way solenoid-actuated slide selector valve comprising
a housing, means defining a bore, a chamber and a cavity in said housing, the chamber and the cavity disposed at opposite ends of the bore from each other, inlet, return, and outlet ports communicating with the bore, a valve spool including at least three spaced lobes slidably mounted in the bore, metering slots for said outlet ports cooperating with corresponding lobes on said spaced lobes, a piston slidable in the chamber and being adapted to translate with said valve spool, a spring system, disposed in the cavity and being mounted about a stem provided on the one end of said valve spool, for returning said valve spool to a position characterizing a neutral state for said valve, such neutral state being characterized by certain lobes of said spaced lobes covering said metering slots, lines for ingress of fluid from said inlet port to said chamber to each side of said piston, corresponding poppet valve mechanisms for respectively closing off said ingress lines from the chamber in the neutral state for said valve and being actuatable by energization of corresponding associated solenoids, corresponding return lines respectively connecting said poppet valve mechanisms to said return port, said return lines communicating with the chamber in the neutral state for said valve, whereby upon actuation of one of said poppet valve mechanisms by the energization of its associated solenoid, its corresponding ingress line communicates with the chamber to one side of said piston, thereby establishing an unequal and greater force on said piston on such side over that on the other side of said piston, to drive the valve spool in the direction of such force to uncover certain metering slots from across their outlet ports while fluid is exhausted from the chamber on the other side of said piston through its corresponding return line in communication with said return port, the one outlet port communicating with said return port by the uncovering of one of its metering slots and the other outlet port communicating with said inlet port by the uncovering of one of its metering slots, said spring system returning the valve spool to the position characterizing the neutral state for said valve upon de-energization of such solenoid.

13. The valve of claim 12 including a restricting orifice in each of said ingress lines between its corresponding poppet valve mechanism and the chamber, whereby the rate of opening said valve is controlled over a time span independently of the energization of the solenoid associated with the corresponding poppet valve mechanism.

14. The valve of claim 13 including a restricting orifice in the piston to provide additional variation in the rate of fluid flow to the return port.

15. A four-way pilot-operated selector valve comprising in combination, a body having an input port, a return port and a pair of outlet ports, means in said body defining a bore, said bore communicating with said input, return and outlet ports, a valve spool having spaced lobes and being slidably mounted in said bore, a pair of metering slots for each of said outlet ports and being covered by corresponding lobes of said spaced lobes to characterize said valve as being in a neutral position, a fluid chamber in said body, a piston slidably mounted in said chamber and adapted to slide with said valve spool, a cavity in said body, a spring system mounted on the other end of said valve spool and disposed in said cavity for returning said valve spool to the neutral position for said valve, pilot mechanisms for actuating said selector valve whereby said spool translates to cause intercommunication between said inlet, return and outlet ports, passageways communicable with said inlet port and being connected to one side of said pilot mechanisms to said fluid chamber, and return conduits connecting the other side of said pilot mechanisms to said return port, whereby energization of said pilot mechanisms separately from each other establishes fluid communication to a corresponding one of said passageways with said fluid chamber and to a corresponding side to said piston therein from said input port, said valve spool thereby translating in the direction of an applied force to said piston to uncover a metering slot to a corresponding outlet port.

16. The valve of claim 15 including a restricting orifice in each of said passageways, whereby the rate of opening said valve is controlled over a time span independently of the actuation of said pilot mechanisms.

17. The valve of claim 16 including a restricting orifice in said piston to provide additional variation in the rate of opening said valve.

* * * * *